United States Patent
Morelli et al.

(10) Patent No.: US 10,989,119 B2
(45) Date of Patent: Apr. 27, 2021

(54) PLANET-CARRIER FOR A MECHANICAL REDUCTION GEAR OF AN AIRCRAFT TURBINE ENGINE

(71) Applicant: SAFRAN TRANSMISSION SYSTEMS, Colombes (FR)

(72) Inventors: Boris Pierre Marcel Morelli, Moissy-Cramayel (FR); Patrice Julien Ptaszynski, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/689,743

(22) Filed: Nov. 20, 2019

(65) Prior Publication Data
US 2020/0165979 A1    May 28, 2020

(30) Foreign Application Priority Data
Nov. 23, 2018  (FR) ...................................... 1871753

(51) Int. Cl.
  *F02C 7/36*    (2006.01)
  *F16H 57/04*   (2010.01)
  *F16H 57/08*   (2006.01)

(52) U.S. Cl.
  CPC ........... *F02C 7/36* (2013.01); *F16H 57/0479* (2013.01); *F16H 57/082* (2013.01); *F05D 2260/40311* (2013.01); *F05D 2260/98* (2013.01)

(58) Field of Classification Search
  None
  See application file for complete search history.

(56) References Cited

U.S. PATENT DOCUMENTS

| | | | |
|---|---|---|---|
| 8,820,478 B2 | 9/2014 | Gauthier et al. | |
| 9,523,424 B2 * | 12/2016 | Altamura | F16H 57/046 |
| 9,927,021 B1 | 3/2018 | Vorberger et al. | |
| 10,302,187 B2 * | 5/2019 | Lao | F16H 57/0479 |

(Continued)

FOREIGN PATENT DOCUMENTS

| | | |
|---|---|---|
| DE | 102010054870 A1 | 6/2012 |
| EP | 2954233 A1 | 12/2015 |

(Continued)

OTHER PUBLICATIONS

European Search Opinion from corresponding application EP19209164A. (in French) (Year: 2019).*

(Continued)

*Primary Examiner* — Dirk Wright
(74) *Attorney, Agent, or Firm* — Christensen O'Connor Johnson Kindness PLLC

(57) ABSTRACT

A planet-carrier for a mechanical reduction gear of a turbine engine, in particular of an aircraft, this planet-carrier having a rotation axis and comprising axes for guiding the planet gears that are arranged around and parallel with the rotation axis, each guiding axis having a general tubular shape of which the outer periphery comprises only two coaxial and adjacent cylindrical tracks of the respective rollers of two annular rows of rollers, wherein each axis has an inner periphery that is substantially bi-conical and comprising two coaxial and adjacent frustoconical surfaces, these inner frustoconical surfaces converging towards one another and extending respectively radially inside the tracks.

11 Claims, 9 Drawing Sheets

(56) References Cited

U.S. PATENT DOCUMENTS

| | | |
|---|---|---|
| 10,458,279 B2 | 10/2019 | Gedin et al. |
| 10,844,905 B2 * | 11/2020 | Meyer ................. F16H 57/0479 |
| 2010/0304919 A1 | 12/2010 | Griffin et al. |
| 2013/0225353 A1 | 8/2013 | Gallet et al. |
| 2015/0377343 A1 | 12/2015 | Fugel et al. |
| 2019/0162294 A1 | 5/2019 | Nique et al. |
| 2020/0165980 A1 * | 5/2020 | Di Giovanni ......... F16H 57/042 |
| 2020/0284203 A1 * | 9/2020 | Simon ................. F16H 57/0486 |

FOREIGN PATENT DOCUMENTS

| | | |
|---|---|---|
| EP | 3333459 A1 | 6/2018 |
| EP | 3489550 A1 | 5/2019 |
| FR | 2987416 A1 | 8/2013 |
| FR | 3041054 A1 | 3/2017 |
| WO | 2010/092263 A1 | 8/2010 |

OTHER PUBLICATIONS

Rapport de Recherche Préliminaire, dated Jul. 23, 2019, issued in corresponding French Application No. 1871753, filed Nov. 23, 2018, 2 pages.

\* cited by examiner

[Fig.1]
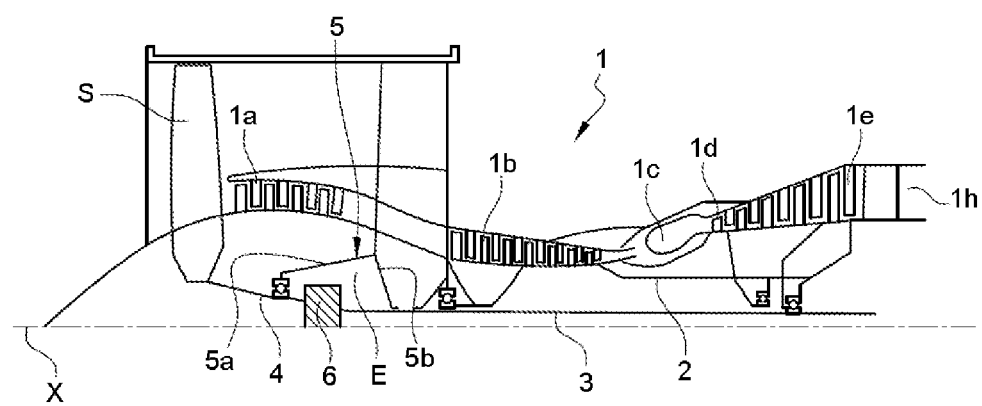

[Fig.2]
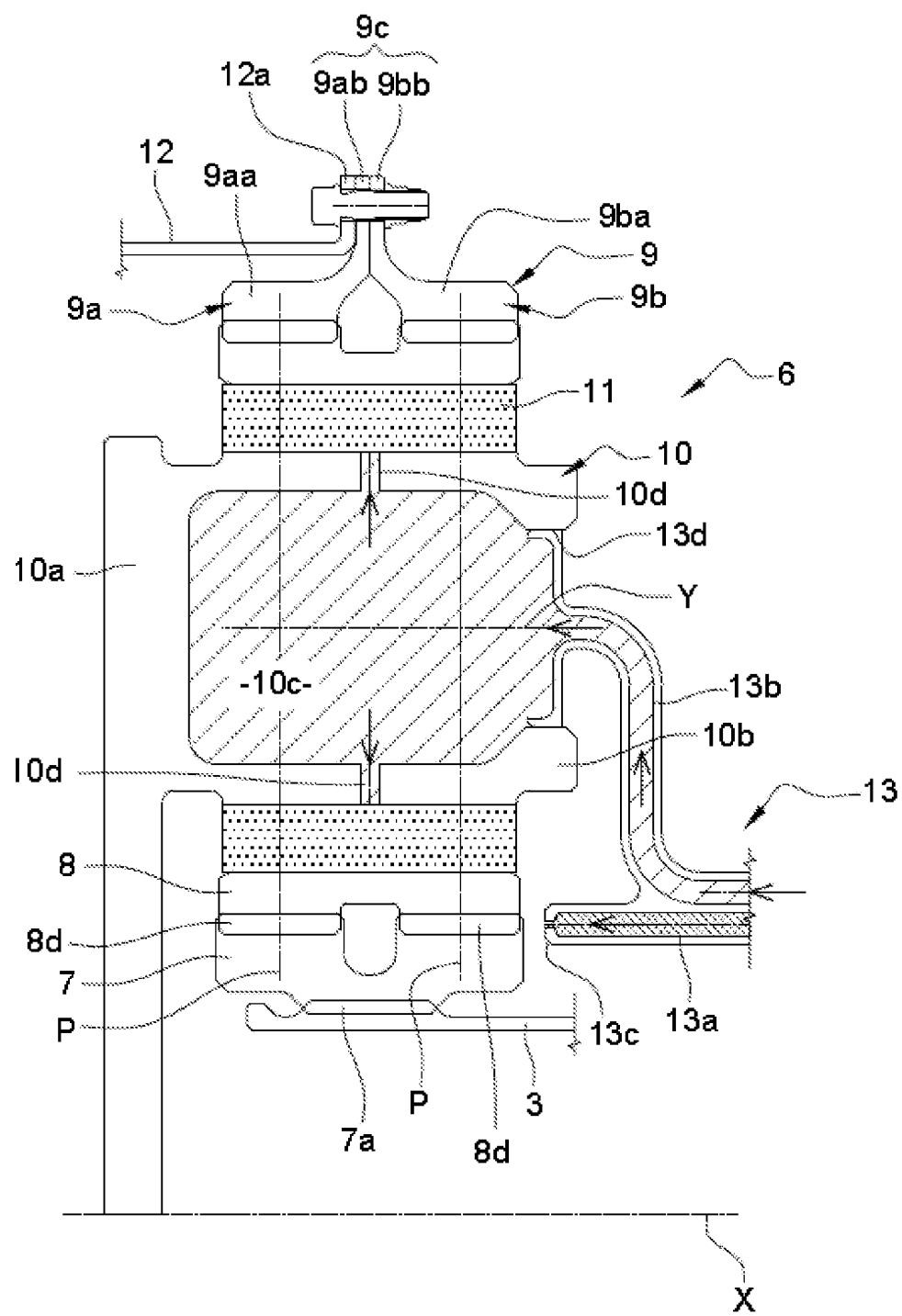

[Fig.3]
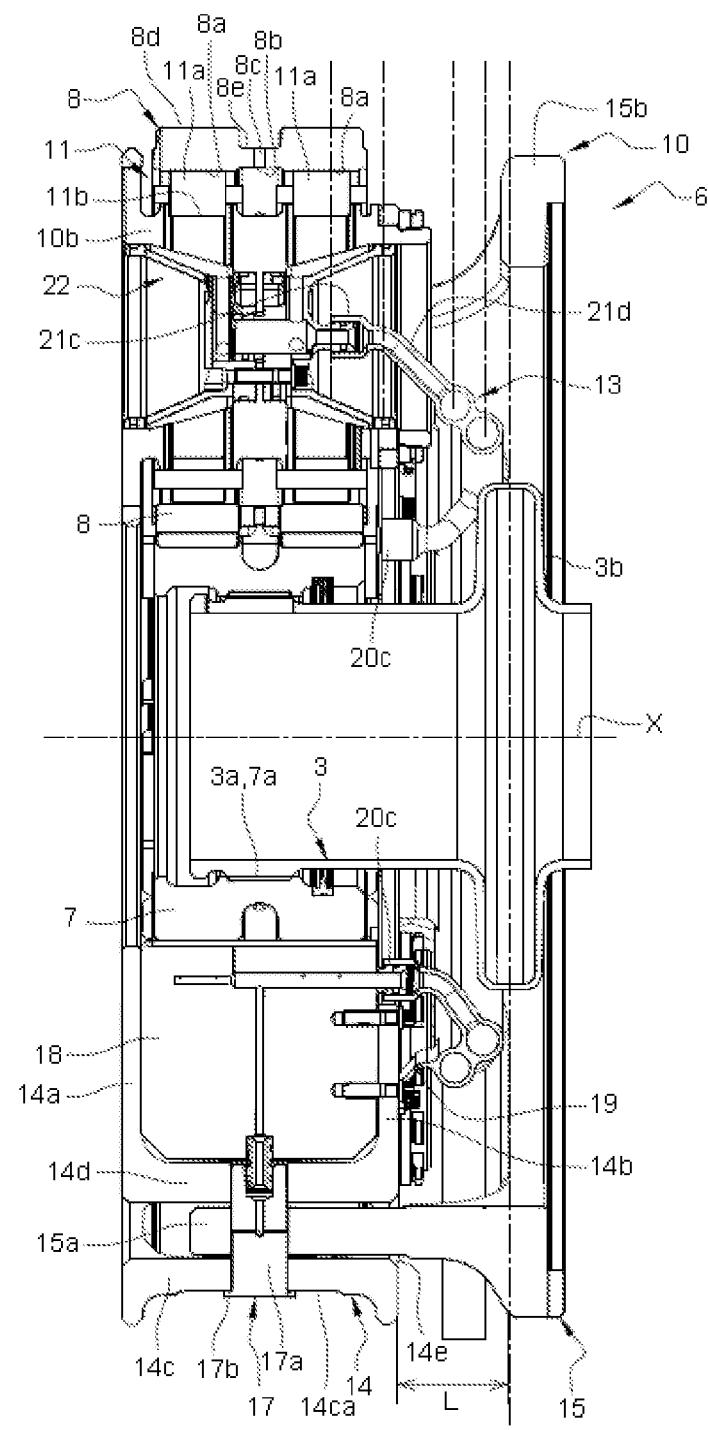

[Fig.4]
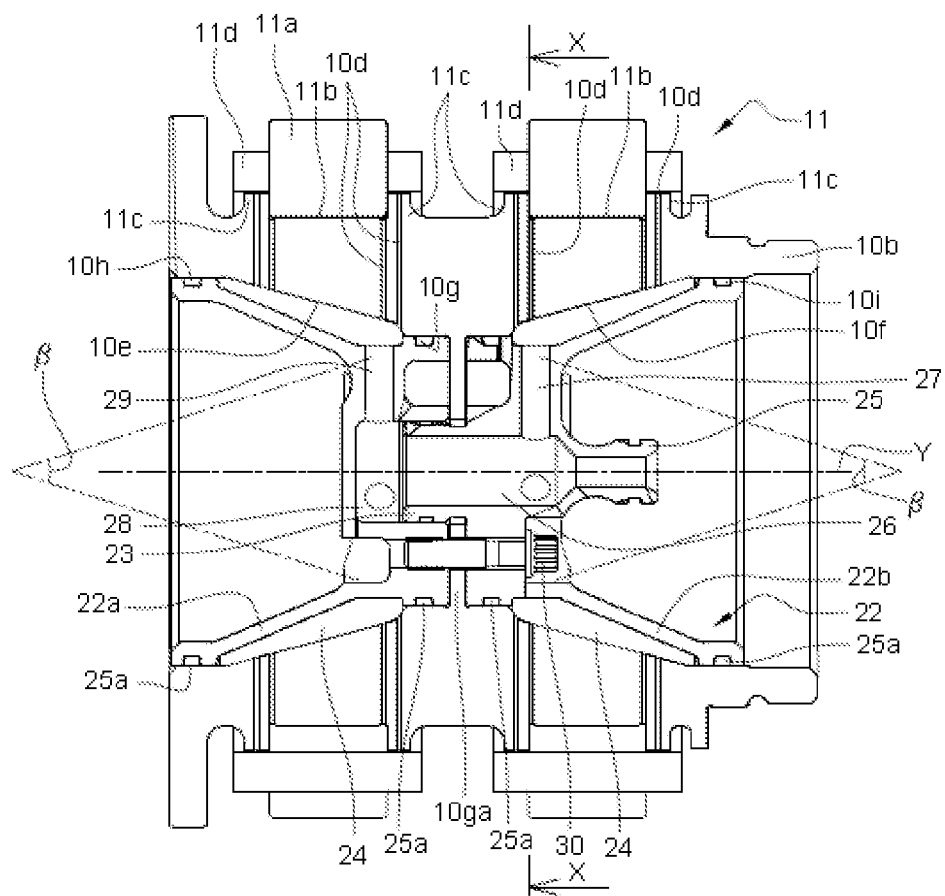

[Fig.5]
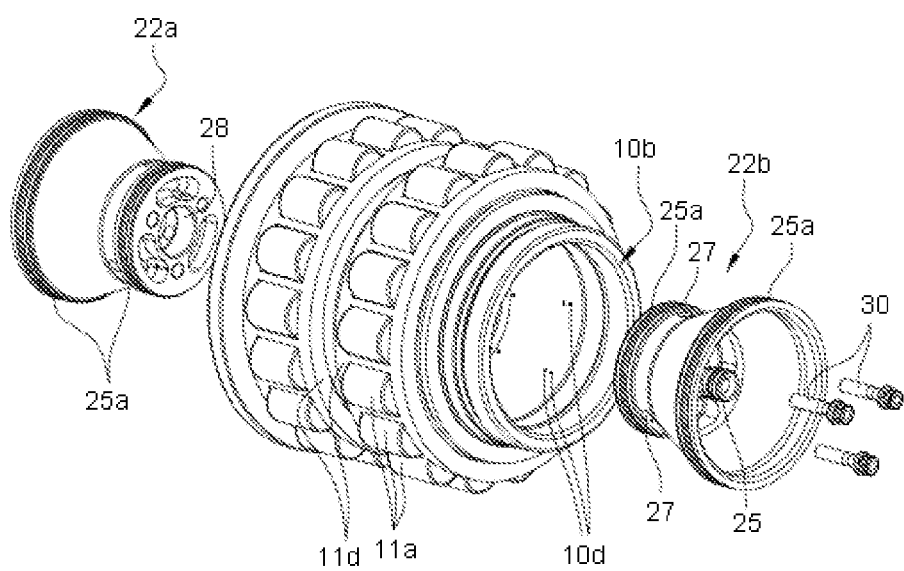

[Fig.6]
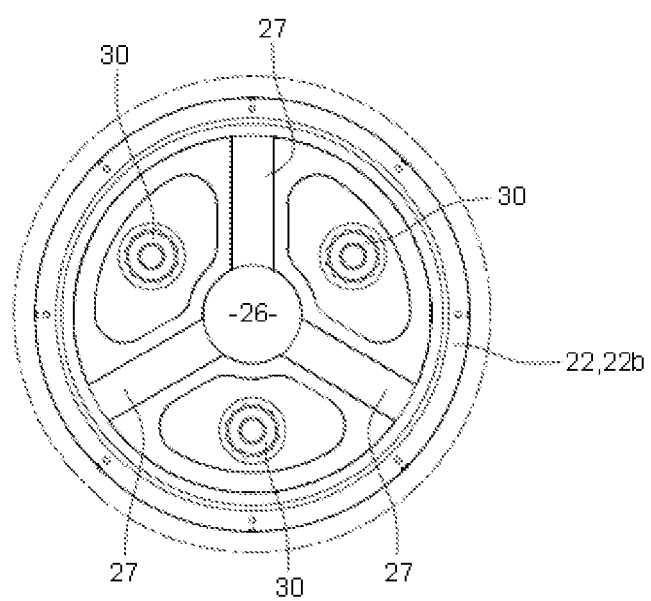

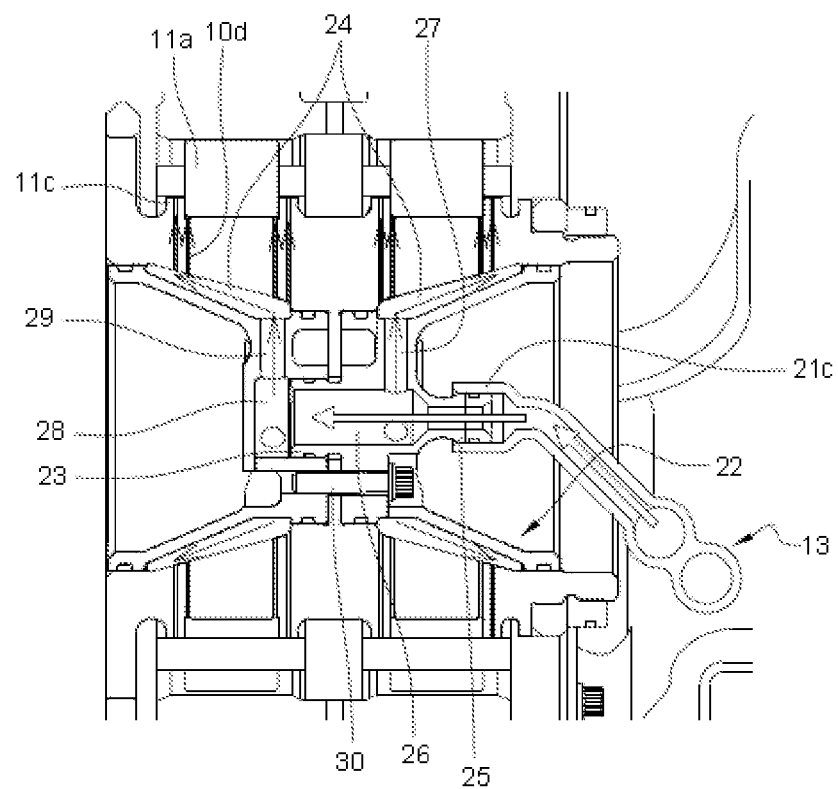
[Fig.7]

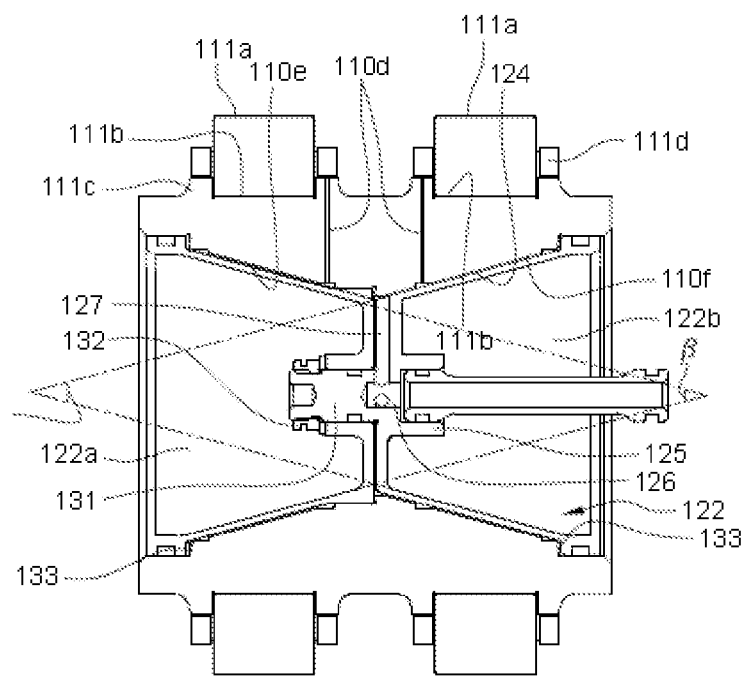
[Fig.8]

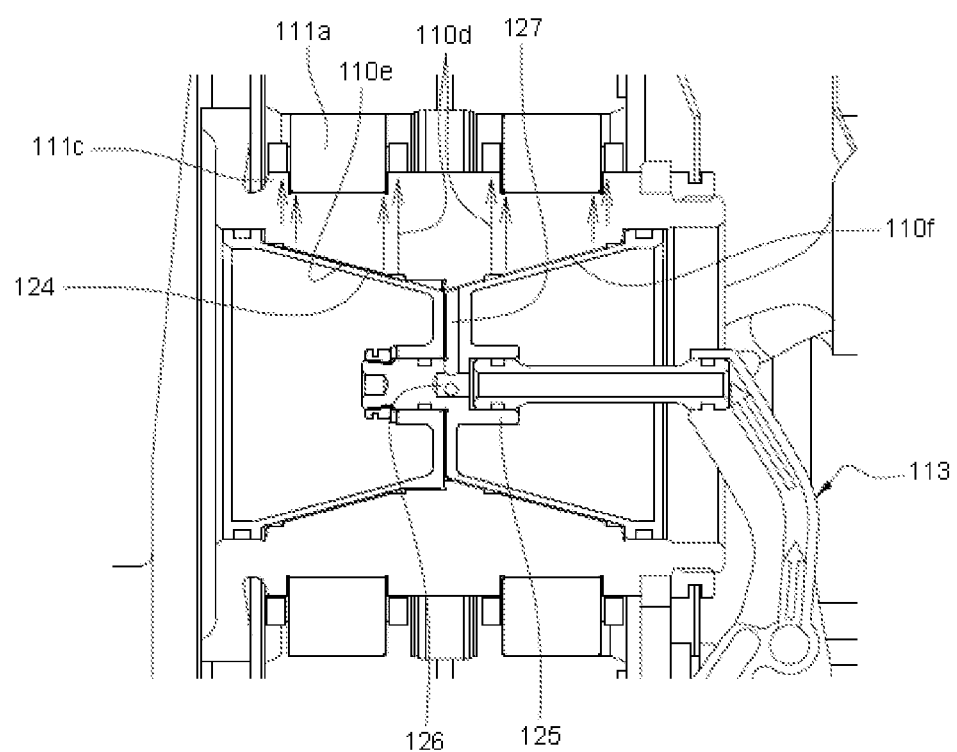
[Fig.9]

PLANET-CARRIER FOR A MECHANICAL REDUCTION GEAR OF AN AIRCRAFT TURBINE ENGINE

TECHNICAL FIELD

Embodiments of the present disclosure relate to the field of reduction gears for turbine engines, in particular of an aircraft.

BACKGROUND

The state of the art comprises, in particular, documents WO-A1-2010/092263, FR-A1-2 987 416, US-A1-2010/304919, EP-A1-2 954 233, US-B1-9 927 021, EP-A1-3 489 550, EP-A1-3 333 459, DE-A1-10 2010 054870 and FR-A1-3 041 054.

The purpose of a mechanical reduction gear is to change the speed to torque ratio between the input shaft and the output shaft of a mechanical system.

The new generations of bypass turbine engines, in particular turbine engines with high dilution rates, comprise a mechanical reduction gear that drives the shaft of a fan. Usually, the purpose of the reduction gear is to transform the "fast" rotational speed of a power turbine into a slower rotational speed for the shaft driving the fan.

Such a reduction gear comprises a central pinion, termed sun gear, a ring gear and pinions termed planet gears, the latter engaging between the sun gear and the ring gear. The planet gears are supported by a chassis termed planet-carrier. The sun gear, the ring and the planet-carrier are planetary elements because the axes of revolution thereof are the same as the longitudinal axis X of the turbine engine. Each planet gear has a different axis of revolution, evenly distributed over a single operating diameter around the axis of the planetary elements. These axes are parallel with the longitudinal axis X.

There are several reduction gear architectures. According to the state of the art in the field of bypass turbine engines, the reduction gears are of the planetary or epicyclic type. In other similar applications, differential or "compound" architectures can be found.

In a planetary reduction gear, the planet carrier is fixed and the ring gear constitutes the output shaft of the device that rotates in the opposite direction to the sun gear.

In an epicyclic reduction gear, the ring gear is fixed and the planet-carrier constitutes the output shaft of the device that rotates in the same direction as the sun gear.

In a differential reduction gear, no element is rotationally fixed. The ring gear rotates in the opposite direction to the sun gear and the planet-carrier.

The reduction gears can comprise one or more gear stages. This gearing is achieved in different ways, such as by contact, by friction and even by magnetic fields. There are several types of gearing by contact, such as with straight or herringbone gearings.

The present disclosure proposes an improvement of a planet-carrier of a reduction gear with a simple, efficient and cost-effective solution to limit the risk of misalignment of the planet gears during operation.

SUMMARY

Embodiments of the disclosure relate to a planet-carrier for a mechanical reduction gear of a turbine engine, in particular of an aircraft. The planet-carrier in some embodiments having a rotation axis and comprising axes for guiding the planet gears that are arranged around and parallel with the rotation axis, each of the guiding axes having a general tubular shape of which the outer periphery comprises only two coaxial and adjacent cylindrical tracks of the respective rollers of two annular rows of rollers, wherein each the axis has an inner periphery that is substantially bi-conical and comprising two coaxial and adjacent frustoconical surfaces, these inner frustoconical surfaces converging towards one another and extending respectively radially inside the tracks.

The misalignment of the tracks of a roller should be reduced to ensure it operates properly under load. Indeed, an excessive misalignment of the tracks causes a clamping effect on the rollers and significantly increases the contact pressures at their ends. Furthermore, depending on the configuration of the reduction gear, a misalignment of the planet gears can occur and generate an overload on the gearings of the planet gears. Indeed, deformations of the planet-carrier under load can cause a misalignment of the tracks, which will then be at an angle with respect to the initial position thereof, thereby causing a misalignment of the gearings of the planet gears and generating an overload.

The problem could be managed by changing the stiffness of the planet-carrier, for example by making the upstream or downstream side thereof more flexible or more rigid. However, the design of the planet-carrier is also constrained by the loads it has to transfer, and it is often impossible to entirely "balance" the planet-carrier. An even simpler way of reducing the overload on the gearings is to work on the stiffness ratios between the upstream and downstream sides of the tracks, by adjusting the axial positions of the frustoconical surfaces. They can be moved, which would also move the "bi-cone" by ±10% of the overall length thereof without affecting the gains on the clamping of the rollers (this equals ±20% over the length of the frustoconical surfaces), which would have the effect of rebalancing the planet-carrier and tracks assembly, and reducing the overload on the gearings.

The disclosure makes it possible to reduce deformation and therefore misalignments of the tracks by varying the profile, and therefore the thickness, of each guiding axis along the rotation axis. Suitable results are achieved with a bi-conical shape, as it stiffens the axis in the middle thereof and leaves the longitudinal ends of the axis free to undergo deformations. This form optimizes the misalignment, at equal mass. The angle of the cone of each frustoconical surface directly influences the value of the misalignment. The gain on the misalignment compared with an axis with a cylindrical inner periphery can be in excess of 50%.

The solution proposed below is compatible with any type of reduction gear (planetary, epicyclic, etc.). It is compatible with any type of gearing (straight, herringbone), and with any type of planet-carrier, whether it is a single-block or of the cage-carrier/cage type, and it is compatible with bearings of planet-carriers made of rolling elements (ball bearings, roller bearings, tapered roller bearings, etc.).

Embodiments of the planet-carrier according to the disclosure can comprise one or more of the following features, taken individually or in combination:

the frustoconical surfaces are directly connected to one another by the ends thereof with the smallest diameter;
the frustoconical surfaces are connected to one another by an inner cylindrical surface comprising a radially internal annular flange; this flange can be used to secure a lubricating and cooling core of the axis and the guiding bearings of the planet gears;

the end with the greatest diameter of each of the frustoconical surfaces is connected to an inner cylindrical surface; this type of surface can be used for the centering and support of the abovementioned core;

each of the axes comprises radial through-orifices for the passage of oil, opening onto the frustoconical surfaces; the axis is thus cooled by the oil, which is then intended to be transported to the bearings for the lubrication thereof;

the orifices open on the tops of radially external annular ribs provided at the outer periphery of each of the axes and delimiting between them the tracks; the tracks and the ribs are advantageously formed of one single part with the axis, the latter being of the integrated bearing inner ring type;

the frustoconical surfaces have substantially the same length along the rotation axis and a same cone angle; the guiding axis therefore has a symmetry of revolution about the longitudinal axis thereof; the term "substantially over one same length" means here a maximum length deviation between the frustoconical surfaces of 20%;

each of the frustoconical surfaces has a cone angle ranging from 10 to 50°, and preferably from 20 to 40°; and a lubricating and cooling core is mounted inside each of the guiding axes so as to at least cover the frustoconical surfaces.

The disclosure further relates to a turbine engine, in particular of an aircraft, comprising a mechanical reduction gear equipped with a planet-carrier such as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a schematic axial cross-sectional view of an example of a turbine engine comprising one or more aspects the disclosure;

FIG. 2 is a partial axial cross-sectional view of one example of a mechanical reduction gear;

FIG. 3 is a cross-sectional view of one example of a mechanical reduction gear incorporating an aspect of the disclosure;

FIG. 4 is a cross-sectional view of a detail of FIG. 3 and shows a guiding axis of a planet gear wherein is mounted a lubricating and cooling core;

FIG. 5 is an exploded perspective view of the axis and of the core of FIG. 4;

FIG. 6 is a cross-sectional view along the line X-X of FIG. 4;

FIG. 7 is a view similar to that of FIG. 4 and shows the path of the lubricating and cooling oil;

FIG. 8 is a view similar to that of FIG. 4 and showing an alternative embodiment of the core; and FIG. 9 is a view similar to that of FIG. 8 and shows the path of the lubricating and cooling oil.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 describes a turbine engine 1 that comprises, conventionally, a fan S, a low-pressure compressor 1$a$, a high-pressure compressor 1$b$, an annular combustion chamber 1$c$, a high-pressure turbine 1$d$, a low-pressure turbine 1$e$, and an exhaust pipe 1$h$. The high-pressure compressor 1$b$ and the high-pressure turbine 1$d$ are connected by a high-pressure shaft 2 and form with the latter a high-pressure (HP) body. The low-pressure compressor 1$a$ and the low-pressure turbine 1$e$ are connected by a low-pressure shaft 3 and form with the latter a low-pressure (LP) body.

The fan S is driven by a fan shaft 4, which is driven with the LP shaft 3 by a reduction gear 6. The reduction gear 6 is generally of the planetary or the epicyclic type.

Although the following description relates to a planetary reduction gear or an epicyclic gear train, it also applies to a mechanical differential, wherein the three components, i.e. the planet-carrier, the ring gear and the sun gear are rotationally mobile, the rotation speed of one of these components depending on the speed differential of the two other components.

The reduction gear 6 is positioned in the front part of the turbine engine. A fixed structure comprising schematically, in this case, an upstream part 5$a$ and a downstream part 5$b$, constituting the engine crankcase or stator 5, is arranged to form an enclosure E around the reduction gear 6. This enclosure E is here closed in the upstream part by gaskets located at the level of a bearing and making it possible for the passage of the fan shaft 4, and in the downstream section by gaskets located at the level of the passage of the LP shaft 3.

FIG. 2 shows a reduction gear 6 that can have different architectures depending on whether some parts are fixed or rotating. At the inlet, the reduction gear 6 is connected to the LP shaft 3, for example by means of inner flutes 7$a$. The LP shaft 3 drives a planet pinion termed sun gear 7. The sun gear 7, of which the rotation axis is the same as that of the turbine engine X, drives a series of pinions termed planet gears 8, these planet gears being evenly distributed over one single diameter around the rotation axis X. This diameter is equal to twice the operating center distance between the sun gear 7 and the planet gears 8. The number of planet gears 8 generally ranges from three to seven for this type of application.

The planet gears 8 are maintained by a chassis termed planet-carrier 10. Each planet gear 8 rotates about its own axis Y and engages with the ring gear 9.

At the output, this provides:

In an epicyclic configuration, the planet gears 8 rotationally drive the planet-carrier 10 about the axis X of the turbine engine. The ring gear is secured to the engine crankcase or the stator 5 by means of a ring-carrier 12 and the planet-carrier 10 is secured to the fan shaft 4.

In a planetary configuration, the planet gears 8 are maintained by a planet-carrier 10 that is secured to the engine crankcase or the stator 5. Each planet gear drives the ring gear, which is supported on the fan shaft 4 by means of a ring-carrier 12.

Each planet gear 8 is mounted free to rotate by a bearing 11, for example a roller bearing or a hydrostatic bearing. Each bearing 11 is mounted on one of the axes 10$b$ of the planet-carrier 10 and all the axes are positioned with respect to one another by means of one or more structural chassis 10a of the planet-carrier 10. The number of axes 10b and of bearings 11 is equal to the number of planet gears. For operating, assembly, manufacturing, control, repairs or replacement reasons, the axes 10b and the chassis 10a can be divided into several parts.

For the same reasons mentioned above, the gearing of a reduction gear can be divided into several helixes, each with a median plane P. In this example, the operation of a reduction gear with several helixes and with a ring gear divided into two half-ring gears is detailed:

A front half-ring gear 9a constituted by a rim 9aa and an attachment half-flange 9ab. The rim 9aa has the front helix of the gearing of the reduction gear. This front helix engages with that of the planet gear 8, which in turn engages with that of the sun gear 7.

A rear half-ring gear 9b constituted by a rim 9ba and an attachment half-flange 9bb. The rim 9ba has the rear helix of the gearing of the reduction gear. This rear helix engages with that of the planet gear 8, which in turn engages with that of the sun gear 7.

Although the helix widths vary between the sun gear 7, the planet gears 8, and the ring gear 9 because of overlapping gearings, they are all centered on a median plane P for the front helixes, and on another median plane P for the rear helixes. In the other FIGURES, in the case of a roller bearing with two rows of rollers, each row of rolling elements is also centered on two median planes.

The attachment half-flange 9ab of the front ring gear 9a and the attachment half-flange 9bb of the rear ring gear 9b form the attachment flange 9c of the ring gear. The ring gear 9 is secured to a ring-carrier by assembling the attachment flange 9c of the ring gear to the attachment flange 12a of the ring-carrier for example by means of a bolted assembly.

The arrows of the FIG. 2 show the path of the oil in the reduction gear 6. The oil arrives in the reduction gear 6 from the stator part 5 in the distributor 13 by different techniques that are not detailed in this view as they are specific to one or more types of architecture. The distributor is divided into 2 parts, and generally each part has the same number of planet gears. The purpose of the injectors 13a is to lubricate the gearings and the purpose of the arms 13b is to lubricate the bearings. The oil is brought to the injector 13a, exiting at the end 13c thereof to lubricate the gearings. The oil is also brought to the arm 13b and circulates through the supply intake 13d of the bearing. The oil then circulates through the axis or in one or more buffer zones 10c to then exit through the orifices 10d in order to lubricate the bearings of the planet gears.

FIG. 3 shows an embodiment of a planet-carrier 10 according to the disclosure. The planet-carrier 10 of the reduction gear 6 of FIG. 3 is of the cage 14 and cage-carrier 15 type, the cage 14 and the cage-carrier 15 being connected by ball and socket connections.

The cage 14 comprises two radial annular walls 14a, 14b that extend around the axis X, these walls 14a, 14b being parallel and being respectively a front radial wall 14a and a rear radial wall 14b. The walls 14a, 14b are connected to one another at the outer peripheries thereof by pairs of fins 14c, 14d, that are evenly distributed around the axis X. These pairs of fins provide a structural connection between the walls 14a, 14b. Each pair of fins comprises two fins, respectively radially external 14c and radially internal 14d, that extend substantially parallel along the axis X at a radial distance from one another.

The pairs of fins 14c, 14d define between them apertures that extend circumferentially about the axis X and are axially delimited by the outer peripheral edges of the walls 14a, 14b. There are 5 pairs of fins in the example shown.

Each pair of fins forms a clevis to receive a finger 15a of the cage-carrier 15. In other words, the fins of each pair define between them a housing to receive a finger 15a of the cage-carrier 15. Oblong openings 14e are provided in the rear wall 14b so as to let the fingers 15a pass between the fins 14c, 14d. The wall 14a can comprise similar openings aligned axially with the openings 14e of the wall 14b.

The number of fingers 15a is equal to the number of pairs of fins 14c, 14d and is 5 in the example shown. These fingers 15a extend axially in the upstream direction from a ring 15b of the cage-carrier 15 extending about the axis X. The fingers 15a of the cage-carrier 15 are engaged in the housings between the fins by an axial translation motion from the rear, through the openings 14e of the wall 14b.

Each finger 15a comprises, substantially in the middle thereof, a recess for mounting a ball and socket element (not shown) intended to be intersected by a cylindrical pin 17 supported by each pair of fins 14c, 14d. Each pin 17 intersects with the inter-fin housing and has a substantially radial orientation with respect to the axis X. Each pin 17 comprises a cylindrical body 17a connected at one end, here the radially external end, to a collar 17b. The pin 17 is here engaged by radial translation motion from the outside through the radial orifices of the fins 14c, 14d, the collar 17b thereof being intended to come and bear radially against a flat face 14ca of the outer fin 14c. After the insertion of the pin 17 in the orifices of the fins, until the collar 17b comes to bear against the outer fin, the collar 17b is secured to the fin, for example by screwing.

As can be seen in the drawings, in the assembled position, the ring 15b of the cage-carrier 15 is axially offset by a predetermined distance L1 from the rear wall 14b opposite the cage 14 (FIG. 3).

The cage 14 defines an inner housing for receiving the sun gear 7 with an axis X, the planet gears 8 arranged around the sun gear 7 and engaging therewith, as well as deflectors 18.

As described above for FIG. 2, the sun gear 7 comprises inner flutes 7a for coupling with outer complementary flutes 3a of the LP shaft 3 (FIG. 3). It must be noted that the flutes 3a are located at the front end of the LP shaft 3, which comprises a downstream segment 3b in the form of bellows. This segment 3b is here located in a plane perpendicular to the axis X, which is axially offset from the cage 14 of the planet-carrier 10 and passes substantially through the ring 15b of the cage-carrier 15. This segment 3b provides the LP shaft 3 with some degree of flexibility that limits the transfer of stress from the engine during operation.

The reduction gear 6 comprises a distributor 13 for lubricating oil. The distributor 13 has a generally annular shape around the axis X and it is made of one single part. Here, it is provided and secured on the planet-carrier 10 and comprises, for this purpose, attachment lugs 19a for securing it to the cage 14 of the planet-carrier and in particular to the rear wall 14b thereof.

The distributor 13 comprises oil outlets 20c that are connected to the deflectors 18 in order to supply oil to the latter.

The distributor 13 further comprises oil outlets 21c that are connected to lubricating and cooling cores 22, which are now described with reference to FIGS. 4 to 9. The purpose of the cores 22 is to lubricate and cool the axes 10b of the planet gears 8, which are here centered and guided by bearings 11 with rollers 11a.

In the embodiment examples shown, each axis 10b is guided by a double-roller bearing 11, which has in this case double rows of rollers 11a. The two rows extend about a single axis that corresponds to the axis, indicated as Y of the axis 10b of the planet gear 8.

The rollers 11a are guided in tracks defined by inner and outer rings. In the example shown, a feature of the disclosure resides in that the inner rings for guiding the rollers 11a are incorporated in the axis 10b. The outer periphery of the axis 10b therefore comprises cylindrical tracks 11b for the rolling of the rollers 11a, each track 11b being axially delimited by annular ribs 11c, the purpose of which is to guide the cages 11d maintaining the rollers 11a. Furthermore, FIG. 3 shows that the outer rings are integrated at the inner periphery of the planet gears 8. The inner periphery of the planet gears 8 therefore comprises cylindrical tracks 8a for rolling the rollers 11a, the tracks 8a being separated from one another by an annular groove 8b opening radially inwards and at the bottom of which two radial drill holes 8c have been provided for the flow of oil.

The outer periphery of each planet gear 8 comprises a double-helix gearing 8d, i.e. two adjacent and coaxial helixes that are separated from one another in this case by an annular groove 8e opening radially outwards and at the bottom of which the drill holes 8c open.

The inner periphery of the axis 10b of each planet gear 8 has a generally bi-conical shape and comprises two inner frustoconical surfaces 10e, 10f that are flared in opposite axial directions. The front inner frustoconical surface 10e is thus flared towards the front, and the rear inner frustoconical surface 10f is flared towards the rear. In the example shown, a cylindrical surface 10g is located between the frustoconical surfaces 10e, 10f, a front inner cylindrical surface 10h extends between the front end of the axis 10b and the front end of the surface 10e, and a rear inner cylindrical surface 10i extends between the rear end of the axis 10b and the rear end of this axis 10b.

Orifices 10d for the passage of oil are provided through the axes 10b in a radial direction, and therefore extend between the inner and outer peripheries thereof. In the example shown, they extend between the frustoconical surface 10e, 10f on the one hand, and the tracks 11b and the outer peripheries of the ribs 11c on the other hand.

An annular flange 10ga for attaching the core 22 extends radially inwards from the cylindrical surface 10g. This flange 10ga comprises axial orifices for the passage of screws 30.

The core 22 shown in FIGS. 4 to 7 comprises two coaxial and substantially frustoconical annular shields 22a, 22b, each comprising a first end with a greater diameter and a second opposite end with a smaller diameter. The shields, respectively front shield 22a and rear shield 22b, are secured to one another by the second ends thereof. Similar to the surfaces 10e, 10f, the shields 22a, 22b are thus flared in opposite axial directions.

The shields 22a, 22b are mounted adjusted inside the axis 10b and are intended to cover the frustoconical surfaces 10e, 10f to define with the latter at least an annular cavity 24 for the circulation of lubricating and cooling oil of the axis 10b. In the example shown, there are two cavities 24, which are separated from one another by the flange 10ga.

The ends of the shields 22a, 22b each comprise a centering outer cylindrical surface comprising an annular groove for the reception of a gasket 25a. The front shield 22a comprises an upstream end mounted adjusted by the outer cylindrical surface thereof on the surface 10h, and a downstream end mounted adjusted by the outer cylindrical surface thereof on the surface 10g, in front of the flange 10ga. The rear shield 22b comprises an upstream end mounted adjusted by the outer cylindrical surface thereof on the surface 10h, behind the flange 10ga, and a downstream end mounted adjusted by the outer cylindrical surface thereof on the surface 10i.

FIG. 4 shows that the orifices 10d open radially into the cavities 24. It also shows that the shields 22a, 22b comprise fluid connection means for the cavities 24 to the distributor 13 described above.

The rear shield 22b comprises in this case an inner chamber 26 centered on the axis Y and connected, on the one hand, by radial passages 27 formed in the shield to the cavity 24 delimited by the shield and the surface 10f thereof. The shield 22b further comprises a connection tubing 25 centered on the axis Y, one end of which opens into the chamber 26 and the opposite end of which is oriented towards the rear and forms a male connector intended to receive by fitting a female connector an outlet 21c of the distributor 13. As a variant, the tubing 25 could form a female connector.

The rear shield 22b is mounted adjusted in the axis 10b by an axial translation motion from the rear until the front end thereof comes to bear axially against the flange 10ga. The shield 22b comprises at the front end thereof another connection tubing 23 centered on the axis Y, which defines a front end part of the chamber 26 and is intended to intersect axially with the flange 10ga, at the center thereof, for the purpose of connecting the chamber 26 to an inner chamber 28 of the front shield 22a. The chamber 26 thus extends between the tubing 25 and the chamber 28, the latter being connected to the cavity 24 formed between the shield 22a and the surface 10e by drill holes 29 provided in the shield.

There are three drill holes 27, 29 in each shield 22a, 22b (this number can be of 1 or more) and they are evenly distributed about the axis Y (FIG. 6). In the example, there are provided in the same numbers as the attachment screws. The number depends primarily on the radial space remaining after or before the insertion of the screws. Each shield 22a, 22b further comprises orifices for the passage or screwing of attachment screws 30 that serve to secure them to the flange 10ga. The orifices of the shields are aligned with one another and with the orifices of the flange 10ga and the screws 30 are screwed from the rear and through, in the following order, an orifice of the shield 22b, an aligned orifice of the flange 10ga and an orifice of the shield 22a (see FIG. 4).

FIG. 7 shows the path of oil from the distributor 13 to the rollers 11a, for the purpose of lubricating the rollers and of cooling the axis 10b. The oil penetrates in the chamber 26 through the tubing 25 and then in the chamber 28 through the tubing 23. The chambers 26 and 28 slow down the oil flow (and prevent a Venturi effect at the drill holes 27, 29) and better distribute the oil among the front and rear shields. The oil then circulates through the drill holes 27, 29 and is supplied to the cavities 24. The oil then flows axially along surfaces, from the rear in the upstream direction on the surface 10e, owing to the fact that the drill holes 29 open onto the rear end of the front cavity 24, and from the front towards the rear on the surface 10f, owing to the fact that the drill holes 27 open onto the front end of the rear cavity 24. The oil then circulates in the orifices 10d to reach the tracks 11b and the ribs 11c, for the purpose of lubricating the rollers 11a and the cages 11d. The oil is supplied "cold" by the distributor 13. It circulates in the axis 10b, which is hot, and is therefore heated. It arrives at the right temperature for an optimal lubricating yield of the bearing, having also evacuated the generated heat. The quantity of heat absorbed by the oil depends in particular on the shape of the shields 22a, 22b.

The thickness or the radial dimension of the cavity 24 is chosen based on the expected temperature increase of the oil intended to circulate in the cavity, for example between 10° C. and 60° C. The temperature of the oil exiting the orifices 10d is also influenced by the slope angle of the frustoconical surfaces 10e, 10f and of the shields 22a, 22b, with respect to the axis Y.

This slope angle and more specifically the cone angle β of each frustoconical surface 10e, 10f is preferably selected to stiffen the middle part of the axis 10b and leave the longitudinal ends thereof free. The longitudinal ends are thus more flexible and likely to undergo deformation under load during operations, which better controls the deformations of the axis 10b during operations, thereby preventing uncontrolled deformations from having an impact on the tracks 11b. The tracks 11b remain cylindrical and coaxial and do not undergo misalignment. The cone angles β of the surfaces 10e, 10f are advantageously identical and range from 10 to 50°, and preferably from 20 to 40°.

In the example shown, the frustoconical surfaces 10e, 10f have lengths or axial dimensions that are substantially identical. In alternative version, the lengths can be different and vary from 10 to 20% with respect to one another. This axially varies the stiffness of the axis 10b and reduces the overload on the gearings of the planet gears.

By way of example, one of the surfaces 10e, 10f can have a minimal length of 48 mm and the other can have a maximum length of 72 mm, the "bi-cone" having an overall length of approximately 120 mm.

FIGS. 8 and 9 show an alternative embodiment of the core, which is designated by the reference number 122. The features thereof are designated by the same reference numbers as for the core 22, incremented by a hundred. The above description relating to the core 22 applies to this variant insofar that it does not contradict what follows.

The core 122 differs from the previous embodiment in particular in that the shields 122a, 122b define one single annular cavity 124 with the inner periphery of the axis 110b. This axis 110b does not comprise, in this case, an inner cylindrical surface between the frustoconical surfaces 110e, 110f thereof. The ends with the smallest diameter of the frustoconical surfaces 110e, 110f are thus directly connected to one another. The inner periphery of the axis 110b does not comprise a flange 10ga of the abovementioned type. The cavity 124 has the general shape of a "bobbin". It should also be noted that the radial thickness of this cavity 124 is smaller than that of the previous embodiment. The orifices 110d for the passage of oil are distributed in annular rows and each row of orifices opens into the cavity 124 in the bottom of a radially internal annular groove formed on the surface 110e, 110f.

The chamber 126 of the rear shield 122b fluidly communicates with the tubing 125 and with the radial drill holes 127 that open into the cavity 124. In this case, the chamber 126 is sealed at the front end thereof. The chamber 126 is therefore only formed in the rear shield 122b. The drill holes 127 can also be provided only in the rear shield 122b or provided in this shield 122b and axially sealed by the front shield 122a.

The rear shield 122b comprises a central cylindrical extension 131 towards the front that comprises an outer threading and that intersects with a central orifice of the front shield 122a. This extension 131 receives a nut 132 screwed from the front and that comes to bear axially against the front shield, for the purposes of tightening the assembly. Because of the absence of the flange 10ga of the previous embodiment, the shields 122a, 122b are secured only to one another and are maintained in position inside the axis 110b solely by the adjusted mounting of the shields on the inner periphery of the axis 110b. The tightening of the nut 132 generates an axial tightening of the inner periphery of the axis 110b between the shields 122a, 122b, owing to the complementary shapes.

As is seen in the drawings, the ends with the greatest diameter of the shields can further be tightened axially against the cylindrical shoulders 133 of the inner periphery of the axis 110b during the tightening of the nut 132.

FIG. 9 shows the path of oil from the distributor 113 to the rollers 111a, for the purpose of lubricating the rollers and of cooling the axis 110b. The oil penetrates in the distributor 113 as indicated above and then penetrates in the chamber 126 through the tubing 125. The oil then circulates in the drill holes 127 to supply the cavity 124, substantially in the middle thereof. The oil flows axially along the surfaces 110e, 110f, from the center of the cavity towards the rear and towards the front. The oil then circulates in the orifices 110d to reach the tracks 111b and the ribs 111c, for the purpose of lubricating the rollers 111a and the cage 111d.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A planet-carrier for a mechanical reduction gear of a turbine engine, the planet-carrier having a rotation axis and comprising axes for guiding the planet gears that are arranged around and parallel with the rotation axis, each said guiding axis having a general tubular shape of which the outer periphery comprises only two coaxial and adjacent cylindrical tracks of the respective rollers of two annular rows of rollers, wherein each said axis has an inner periphery that is substantially bi-conical and comprises two coaxial and adjacent frustoconical surfaces, these inner frustoconical surfaces converging towards one another and extending respectively radially inside said tracks.

2. The planet-carrier according to claim 1, wherein the frustoconical surfaces are connected directly to one another by the smallest diameter ends thereof.

3. The planet-carrier according to claim 1, wherein the frustoconical surfaces are connected to one another by an inner cylindrical surface comprising a radially internal annular flange.

4. The planet-carrier according to claim 1, wherein the greatest diameter end of each of the frustoconical surfaces is connected to an inner cylindrical surface.

5. The planet-carrier according to claim 1, wherein each of said axes comprises radial through-orifices for the passage of oil opening on said frustoconical surfaces.

6. The planet-carrier according to claim 1, wherein said orifices open onto the tops of radially external annular ribs provided at the outer periphery of each of said axes and delimiting between themselves said tracks.

7. The planet-carrier according to claim 1, wherein said frustoconical surfaces have substantially the same length along said rotation axis and substantially the same cone angle.

8. The planet-carrier according to claim 1, wherein said frustoconical surfaces each have a cone angle ranging from 10 to 50°.

9. The planet-carrier according to claim 1, wherein the lubricating and cooling core is mounted inside each of said guiding axes so as to cover at least said frustoconical surfaces.

10. The planet-carrier according to claim 1, wherein said frustoconical surfaces each have a cone angle ranging from 20 to 40°.

11. A turbine engine comprising a mechanical reduction gear equipped with a planet-carrier according to claim 1.

* * * * *